(12) United States Patent
Casey et al.

(10) Patent No.: US 10,858,027 B2
(45) Date of Patent: *Dec. 8, 2020

(54) CONTROL OF A POWER-ASSISTED PAYLOAD CARRYING VEHICLE USING OPERATOR-APPLIED FORCE SENSING

(71) Applicant: Segway Inc., Bedford, NH (US)

(72) Inventors: Michael J. Casey, Bedford, NH (US); Kimberley A. St. Louis, North Chelmsford, MA (US); Nicholas A. DeAngelis, Boston, MA (US); Benjamin C. Minerd, Deerfield, NH (US); Robert M. Bowman, Bow, NH (US); Jason A. Swift, Bedford, NH (US)

(73) Assignee: Segway Inc., Bedford, NH (US)

( * ) Notice: Subject to any disclaimer, the term of this patent is extended or adjusted under 35 U.S.C. 154(b) by 266 days.

This patent is subject to a terminal disclaimer.

(21) Appl. No.: 15/617,586

(22) Filed: Jun. 8, 2017

(65) Prior Publication Data

US 2018/0354539 A1 Dec. 13, 2018

(51) Int. Cl.
*B62B 5/00* (2006.01)
*B62B 1/10* (2006.01)
*G01L 5/00* (2006.01)
*G01L 5/22* (2006.01)
*G01L 5/06* (2006.01)
*B62B 5/06* (2006.01)

(52) U.S. Cl.
CPC .............. *B62B 5/0073* (2013.01); *B62B 1/10* (2013.01); *B62B 5/0033* (2013.01); *B62B 5/06* (2013.01); *G01L 5/0095* (2013.01); *G01L 5/22* (2013.01)

(58) Field of Classification Search
CPC ....... B62B 5/0073; B62B 5/0033; B62B 1/10; G01L 5/0095; G01L 5/22
See application file for complete search history.

(56) References Cited

U.S. PATENT DOCUMENTS

| 6,070,679 A * | 6/2000 | Berg ..................... B62B 3/1404 180/19.2 |
| 6,276,471 B1 * | 8/2001 | Kratzenberg ......... B62B 5/0026 180/19.3 |
| 2006/0254831 A1 | 11/2006 | Kamei et al. |
| 2009/0024250 A1 * | 1/2009 | Oaki .................... G05D 1/0227 700/245 |

(Continued)

FOREIGN PATENT DOCUMENTS

| IE | 102009001513 A1 | 9/2010 |
| IE | 102013102020 A1 | 8/2014 |

(Continued)

*Primary Examiner* — Alan D Hutchinson
(74) *Attorney, Agent, or Firm* — Burns & Levinson, LLP; Joseph M. Maraia

(57) ABSTRACT

In a method of operating a payload-carrying vehicle having a system configured to provide torque to ground contacting elements, the method includes, repeatedly measuring a force applied by a user to the vehicle; determining a direction and a magnitude of the measured force; determining a respective amount of torque to apply to each of the ground contacting elements as a function of the determined direction and magnitude; and providing the respective determined amount of torque to each of the ground contacting elements.

12 Claims, 13 Drawing Sheets

(56) References Cited

U.S. PATENT DOCUMENTS

| | | | | |
|---|---|---|---|---|
| 2013/0118818 A1* | 5/2013 | Smith | ............... | B25H 1/04 |
| | | | | 180/19.1 |
| 2014/0114559 A1* | 4/2014 | Nakamura | ......... | G05D 1/0891 |
| | | | | 701/124 |
| 2017/0001656 A1* | 1/2017 | Katayama | ............ | B62B 5/0069 |
| 2018/0118245 A1* | 5/2018 | Chung | ............... | B62B 5/0033 |
| 2019/0111989 A1* | 4/2019 | Neugebauer | ........... | B62B 7/062 |

FOREIGN PATENT DOCUMENTS

| | | | |
|---|---|---|---|
| WO | 2005094480 A2 | 10/2005 | |
| WO | 2008100524 A2 | 8/2008 | |
| WO | 2012160400 A1 | 11/2012 | |

* cited by examiner

CONTROL OF A POWER-ASSISTED PAYLOAD CARRYING VEHICLE USING OPERATOR-APPLIED FORCE SENSING

FIELD OF THE INVENTION

The disclosure relates to control of a power-assisted payload-carrying vehicle.

BACKGROUND OF THE INVENTION

Vehicles known for moving a payload, e.g., boxes, appliances, people, and the like, include hand trucks, carts, pallet jacks, wheel barrows, etc.

For many years, these vehicles were powered only by the operator and this required strength to move a heavy load. Strength was needed on level ground as well as when the load had to be moved on a ramp—either up or down the ramp as the operator needs to balance the load and push, or pull, the vehicle to maintain control and keep it from spilling the payload.

A known powered hand truck is described in U.S. Pat. No. 9,120,657. FIG. 1 is a perspective view of a prior art powered hand truck illustrating a deck 100, a frame 102, a drive axis 103, an electric motor 104, a battery (not shown), a shift box 106, a power switch, handles 108 and wheels 110. Powering the wheels 110 allows for less effort by the operator especially when working with heavier loads and/or pushing the hand truck up a ramp or controlling a heavy hand truck going down a ramp.

What is needed, however, is a payload-carrying vehicle that provides more functionality to the operator than those that are known.

SUMMARY

In one aspect of the present disclosure, a method of operating a payload-carrying vehicle having a system configured for providing torque to one or more ground contacting elements, the method includes, repeatedly measuring a force applied by a user to the vehicle; determining a direction and a magnitude of the measured force; determining a respective amount of torque to apply to each of the one or more ground contacting elements as a function of the measured force; and providing the respective determined amount of torque to each of the ground-contacting elements.

In another aspect of the present disclosure, a method of operating a payload-carrying vehicle having one or more power-assisted ground-contacting elements, comprises, repeatedly: measuring, with a sensing assembly, a force applied by a user to the vehicle; determining, with a processor coupled to the sensing assembly, a direction and a magnitude of the measured force; determining, with the processor, a respective amount of torque to be applied to each of the one or more ground-contacting elements as a function of the determined direction and magnitude of the measured force; and applying, under control of the processor, the respective determined amount of torque to each of the one or more ground-contacting elements.

In another aspect of the present disclosure, a system for operating a payload-carrying vehicle having one or more power-assisted ground-contacting elements, comprises: a sensing assembly configured to repeatedly measure a force applied by a user to the vehicle; and a processor, coupled to the sensor sensing assembly. The processor is configured to repeatedly: determine a direction and a magnitude of the measured force; determine a respective amount of torque to be applied to each of the one or more ground-contacting elements as a function of the determined direction and magnitude of the measured force; and output a control signal to cause the application of the respective determined amount of torque to each of the one or more ground-contacting elements.

BRIEF DESCRIPTION OF THE DRAWINGS

One or more aspects of the disclosure are discussed below with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended to be limiting.

DETAILED DESCRIPTION

Figure 1:
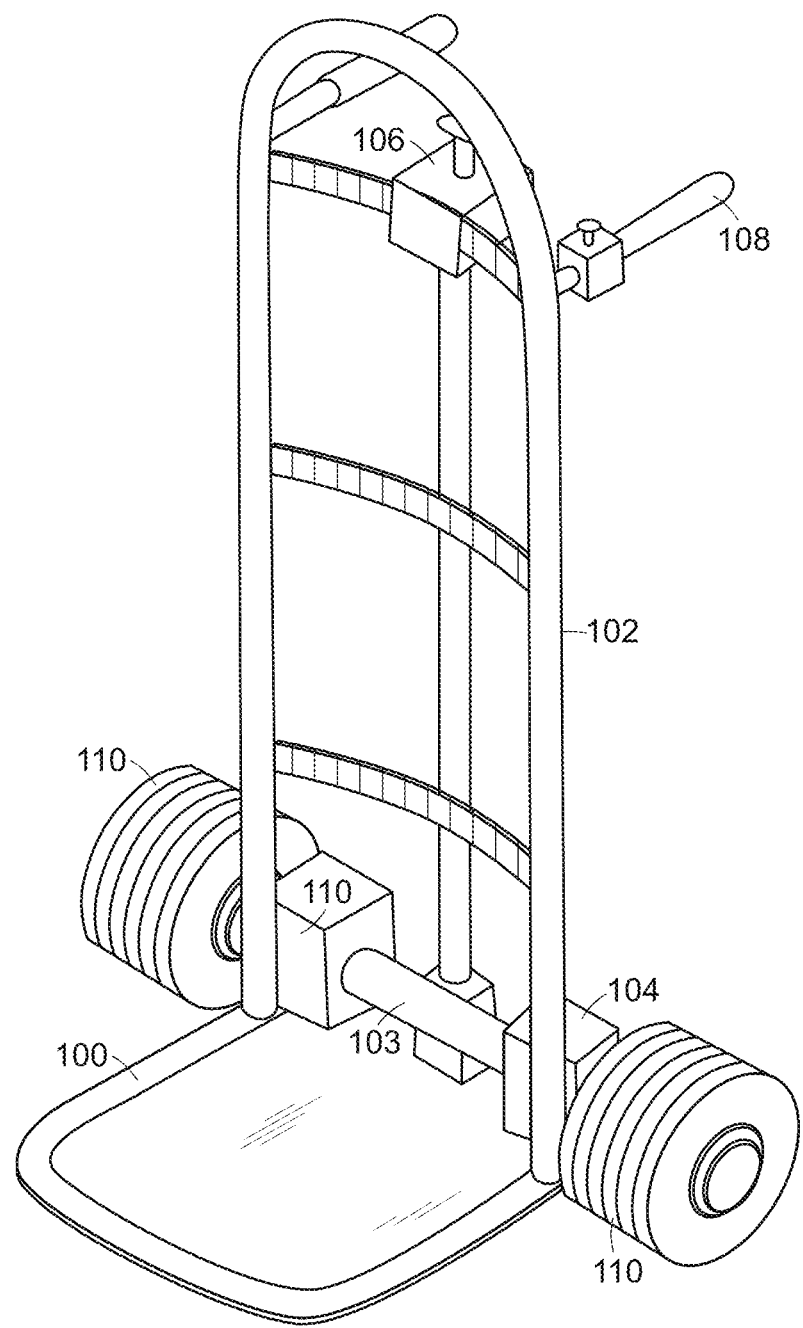
FIG. 1 is a perspective view of a prior art powered hand truck.

In the following detailed description, numerous specific details are set forth in order to provide a thorough understanding of the aspects and implementations of the disclosure. It will be understood by those of ordinary skill in the art that these may be practiced without some of the specific details that are set forth. In some instances, well-known methods, procedures, components and structures may not have been described in detail so as not to obscure the details of the implementations of the disclosure.

It is to be understood that the details of construction and the arrangement of the components set forth in the following description or illustrated in the drawings are not limiting. There are other ways of being practiced or carried out. Also, it is to be understood that the phraseology and terminology employed herein are for the purpose of description only and also should not be regarded as limiting.

It is appreciated that certain features, which are, for clarity, described in the context of separate implementations, may also be provided in combination in a single implementation. Conversely, various features, which are, for brevity, described in the context of a single implementation, may also be provided separately or in any suitable sub-combination.

Generally, in accordance with an aspect of the disclosure, a power-assisted payload carrying vehicle responds with additional torque to the wheels in response to an amount of force applied by the operator. As will be described in more detail below, aspects of the present disclosure allow the operator to use the vehicle in an intuitive manner, i.e., the same as a non-powered vehicle, without having to learn a new procedure of operation. This improves the operator experience by providing a familiar interface to the vehicle.

Preliminarily, it should be noted that embodiment of aspects of the present disclosure are described with respect to a specific type of payload-carrying vehicle, i.e., a hand truck with two wheels that are generally co-axially positioned. It is to be understood that the aspects of the present disclosure are not limited to only a hand truck with two co-axially positioned wheels and the reference to hand truck is only for the purposes of explanation. The aspects of the present disclosure can be applied to, as non-limiting examples, lawnmowers, pallet jacks, suitcases, grocery carts, golf bag carts and wheelbarrows. Similarly, the teachings herein can be applied to payload-carrying vehicles with only one wheel, with two or more wheels, with two aft wheels and one or more forward wheels, with wheel clusters, with treads, or any other type of surface- or ground-contacting, torque-transmitting or traction-providing elements or mechanisms.

Figure 2:
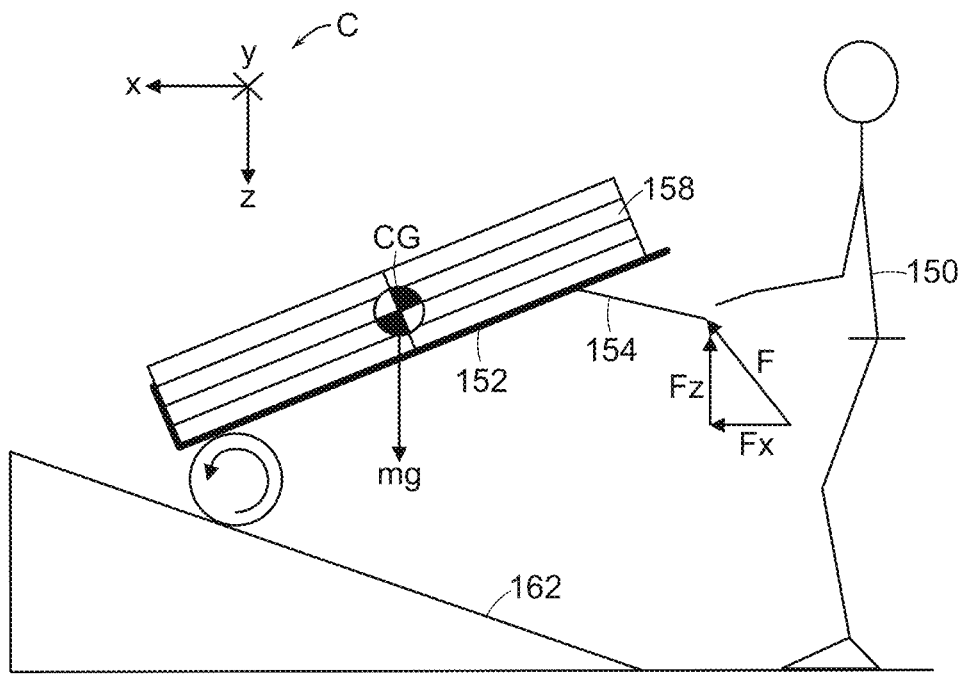
FIG. 2 is a conceptual view of operation of a non-powered hand truck.

Referring now to FIG. 2, an operator 150 of a known, non-powered hand truck 152, maneuvers the hand truck 152 by holding on to a handle 154. The operator 150 applies a force F to the handle to move the hand truck 152 in a desired direction, either forward or backward with respect to the operator 150. As shown in FIG. 2, for example, a payload 158 has a center of gravity CG and the operator 150 is using the hand truck 152 on a ramped surface 162. A weight of the payload 158 is represented by the force mg.

Figure 3:
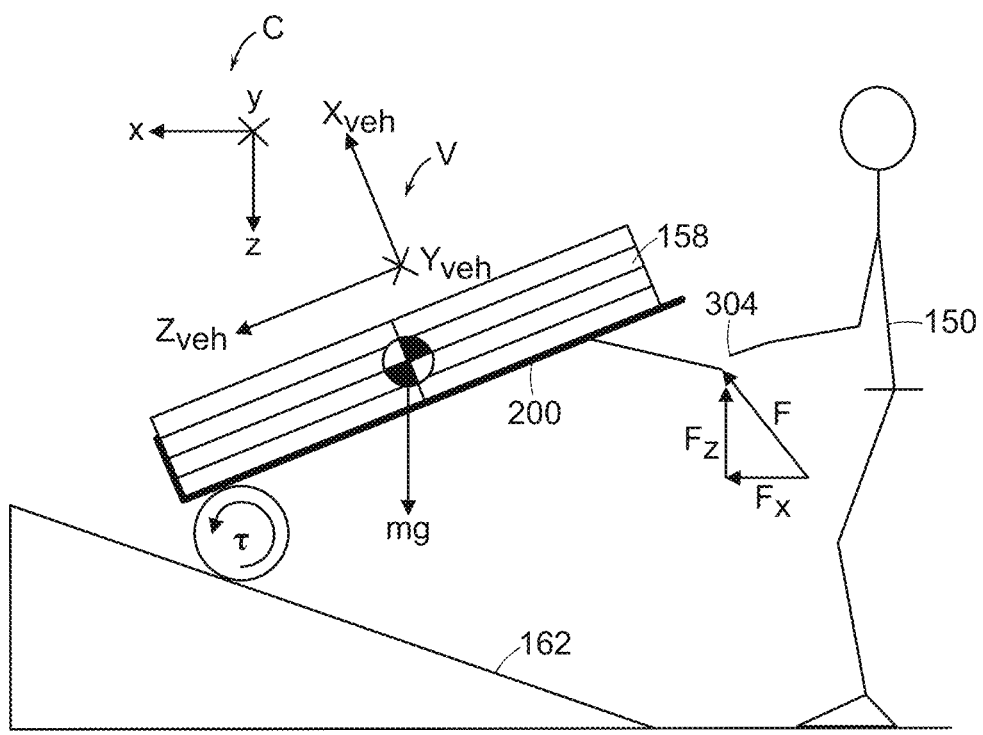
FIG. 3 is a conceptual view of operation of a power-assisted hand truck in accordance with an aspect of the present disclosure.

The force F exerted by the operator 150 on the hand truck 152 can be considered as a vector F with components $F_x$, $F_y$ and $F_z$, along respective X, Y, and Z axes. The X, Y, and Z axes refer to a first coordinate system C, as shown, relative to flat ground. More specifically, as shown in FIGS. 2 and 3, the Z axis is aligned with gravity, the X axis is aligned with a general direction of travel, for example, fore and aft with respect to the operator 150 and the Y axis is lateral with respect to the X axis (into the plane of FIGS. 2 and 3). As known, the hand truck 152 will move in response to the directions and magnitudes of these component forces $F_x$, $F_y$ and $F_z$.

As an example, referring now to FIG. 3, an operator 150 of a power-assisted hand truck 200 in accordance with an aspect of the present disclosure also maneuvers the hand truck 200 by holding on to a handle 208. The handle 208 includes a force sensing assembly 304, described in more detail below, that measures the force F applied by the operator 150 to the handle 208 to move the hand truck 200 in a desired direction, either forward or backward with respect to the operator 150.

As will be described below in more detail, the force F applied by the operator is measured with respect to a second coordinate system V that has three axes $X_{veh}$, $Y_{veh}$ and $Z_{veh}$ that are in a predetermined and fixed relation to the vehicle 200. Thus, the force components along these axes are measured. Subsequently, the "push" and "lift" components, $F_x$ and $F_z$, respectively, are calculated in the X, Y, Z coordinate system C by, for example, a rotation calculation as understood by one of ordinary skill in the art.

The hand truck 200 will apply assistive torque $\tau$ to the wheels as a function of the force F to aid the operator 150 in maneuvering the hand truck 200. Note that the torque $\tau$ applied to the wheels may vary, for instance, a different amount of torque may be applied to each wheel if, for example, a turn is being implemented, or if the vehicle only has one wheel or traction mechanism. As set forth above, the operator 150 is using the hand truck 200 in the same manner as the non-powered hand truck 152 without having to use a different control device such as a throttle, joy stick, etc.

Figure 4:
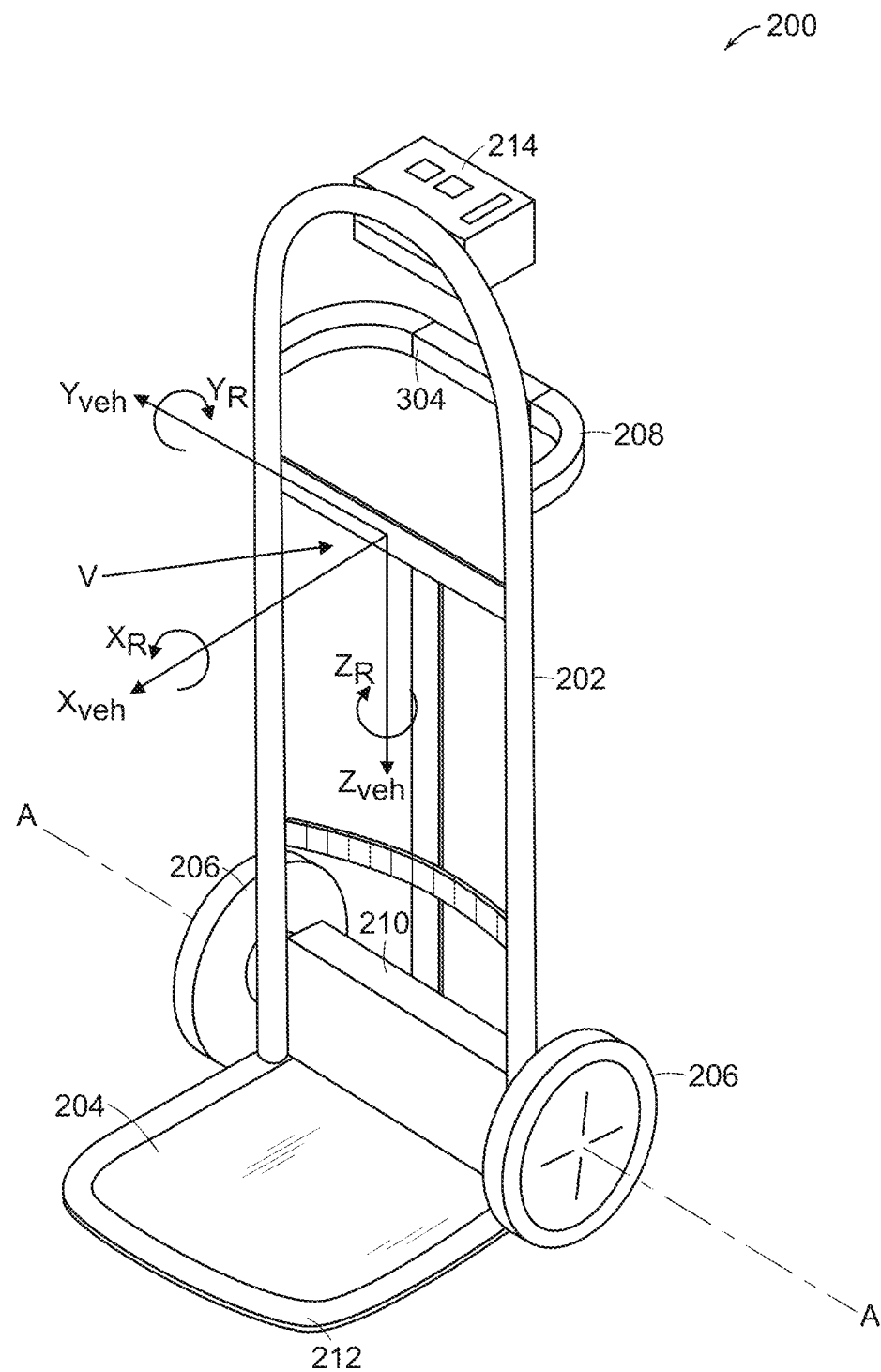
FIG. 4 is a perspective view of a power-assisted hand truck in accordance with an aspect of the present disclosure.

A perspective view of the hand truck 200 in accordance with an aspect of the present disclosure is presented in FIG. 4. The hand truck 200 includes a frame 202, a deck 204, wheels 206 and at least one handle 208. In addition, a drive system 210 may be attached to the frame 202 to provide power to the wheels 206. It should be noted that the wheels 206 are provided such that they are co-axially arranged along an axis A-A whether or not the wheels are coupled to a same axle. A ground contact, also known as a "touchdown" sensor 212 may be provided on the deck 204 to detect when the deck 204 has been placed on a surface such as the ground, a loading dock, street, sidewalk or the like. An I/O console 214 is attached to the frame 202 and coupled to the drive system 210 in order to provide information to, and receive information from, an operator operating the hand truck 200.

The $X_{veh}$, $Y_{veh}$ and $Z_{veh}$ axes presented in FIG. 4 are those of the second coordinate system V and are the same as the ones discussed above with respect to FIG. 3. In addition, as aspects of the present disclosure also measure torque, axes of the torque measurements $X_R$, $Y_R$ and $Z_R$ are also shown.

Figure 5:
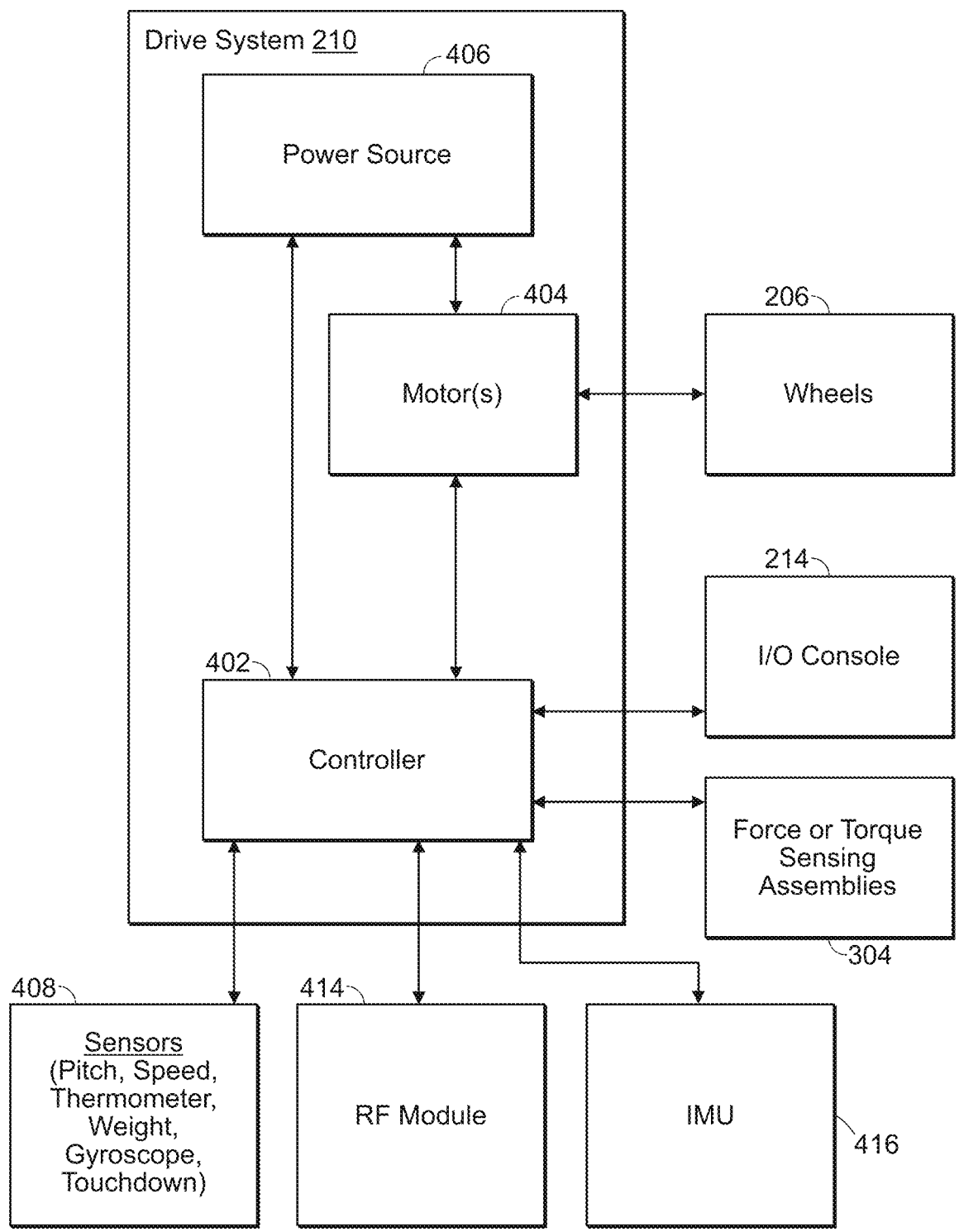
FIG. 5 is a functional block diagram of a vehicle control system in accordance with an aspect of the present disclosure.

As an example, FIG. 5 is a functional block diagram of the hand truck control system. The drive system 210 may include a power source 406, e.g., a rechargeable battery, coupled to one or more motors 404 that are coupled to the wheels 206. The system may include one motor per wheel or a single motor may drive both wheels with, or without, intervening gears or other coupling mechanisms. In addition, as understood by one of ordinary skill in the art, the wheels may be mounted on a single axle or directly coupled to a respective motor with the wheels aligned along the common axis A-A. The batteries may be rechargeable, e.g., nickel metal hydride or Lithium-ion batteries.

A controller 402 is coupled to the motor(s) 404 and the power source 406 and receives inputs from a number of sensors 408 such as an accelerometer, pitch detector, a gyroscope, a thermometer, weight sensor, the touchdown indicator 212, a strain gauge, etc., mounted on the hand truck 200 for monitoring a number of conditions including, but not limited to, pitch, speed, temperature (ambient and/or battery and/or motor), payload weight, etc. In one aspect, the payload weight sensor detects the weight of the payload and the controller 402 adjusts the operation of the system in response. The controller 402 may be coupled to the I/O console 214 to provide/receive information to/from the operator as well as the force or torque sensor assemblies 304. In an alternative embodiment, the controller 400 may connect to a radio frequency (RF) module 414 containing a transceiver to enable communication with a hand held device such as a computer, tablet or smart phone. In addition, an Inertial Measurement Unit (IMU) 416 may also be provided.

The controller 402 may be configured to maintain the stability of the hand truck 200 while it is operating. The controller may continuously sense the orientation of the hand truck, determine the corrective action to maintain stability, and command the wheel motors to make the corrective action. The controller operates in a manner similar to that described in U.S. Pat. Nos. 6,302,230; 6,779,621 and 6,796,396; the subject matter of each of which is hereby incorporated by reference in their entirety for all purposes.

More specifically, the controller 402 receives information, sampling many times per second, e.g., on the order of 100 samples/second, from an assembly of gyroscopes and other sensors provided on the frame of the hand truck. As known, a gyroscope provides information regarding the pitch of an object, e.g., the hand truck, and how far it is away from an upright position, in addition to the rate of change of the pitch, e.g., its pitch rate, which can be adjusted by applying energy to the wheels 206. As known, the gyroscope may be implemented as a solid-state device using the Coriolis effect on a very small scale. Multiple gyroscopes may be provided to detect forward and backward pitch as well as leaning to the left or right (termed "roll"). Redundant sensors 408 may be provided as well as tilt sensors that use an electrolyte fluid to determine a position of the hand truck 200 relative to the ground or operating surface relative to the direction of gravity.

The system measures the amount of effort the operator is exerting while controlling the hand truck via the force or torque sensor assemblies 304. The effort can be measured as force, torque, work, etc. In one aspect, if the amount of effort exceeds a predetermined threshold, more torque is provided to the wheels until the effort needed by the operator is at or below the threshold. The system thus modifies its power output to the wheels in response to the force from the operator.

Of course, the controller 402 for a vehicle that is not a hand truck, i.e., one that does not operate in a "tilted" mode would monitor operation via a subset or superset of sensors described above and have different parameters for proper operation. As above, the hand truck is for explanatory purposes only.

Figure 6A:
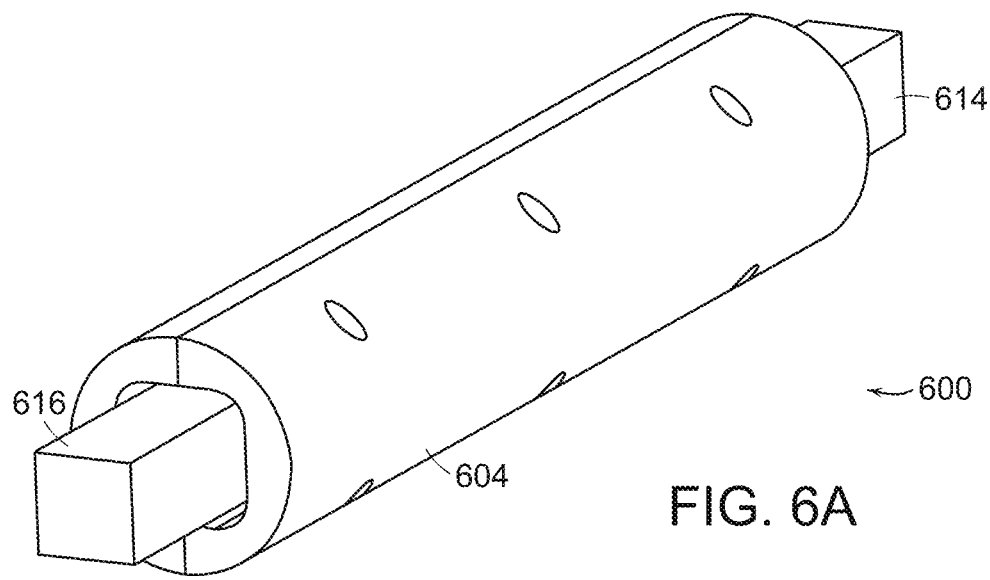
FIGS. 6A-6C are perspective views of a force sensing assembly in accordance with an aspect of the present disclosure.
Figure 6B:
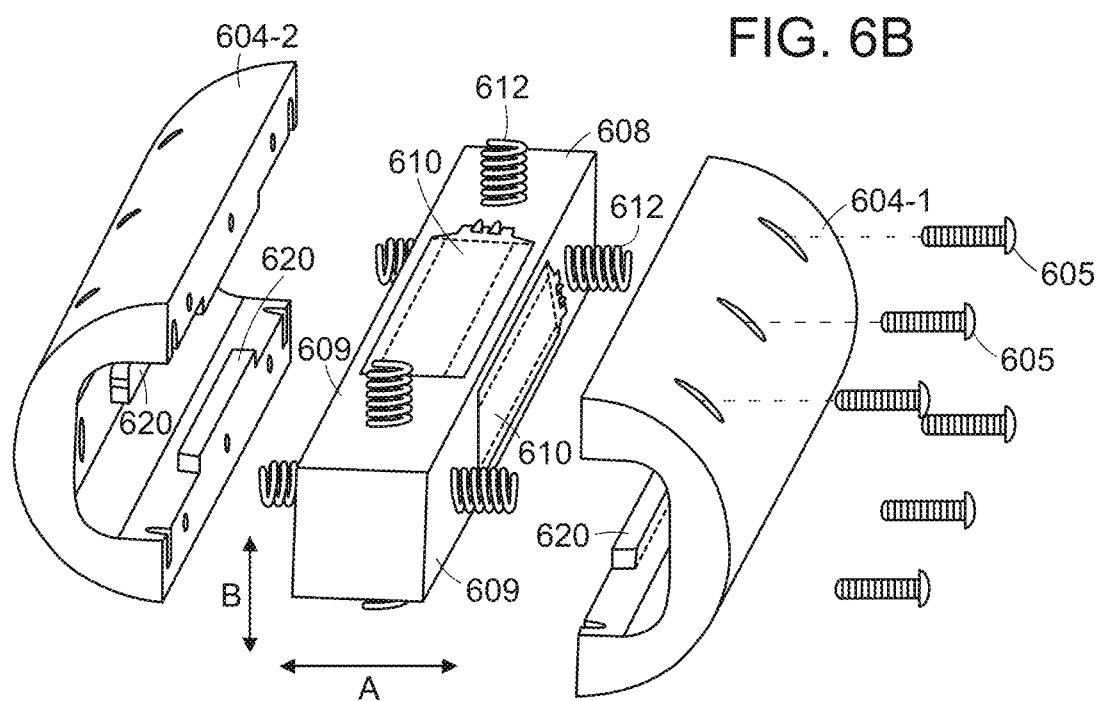
Figure 6C:
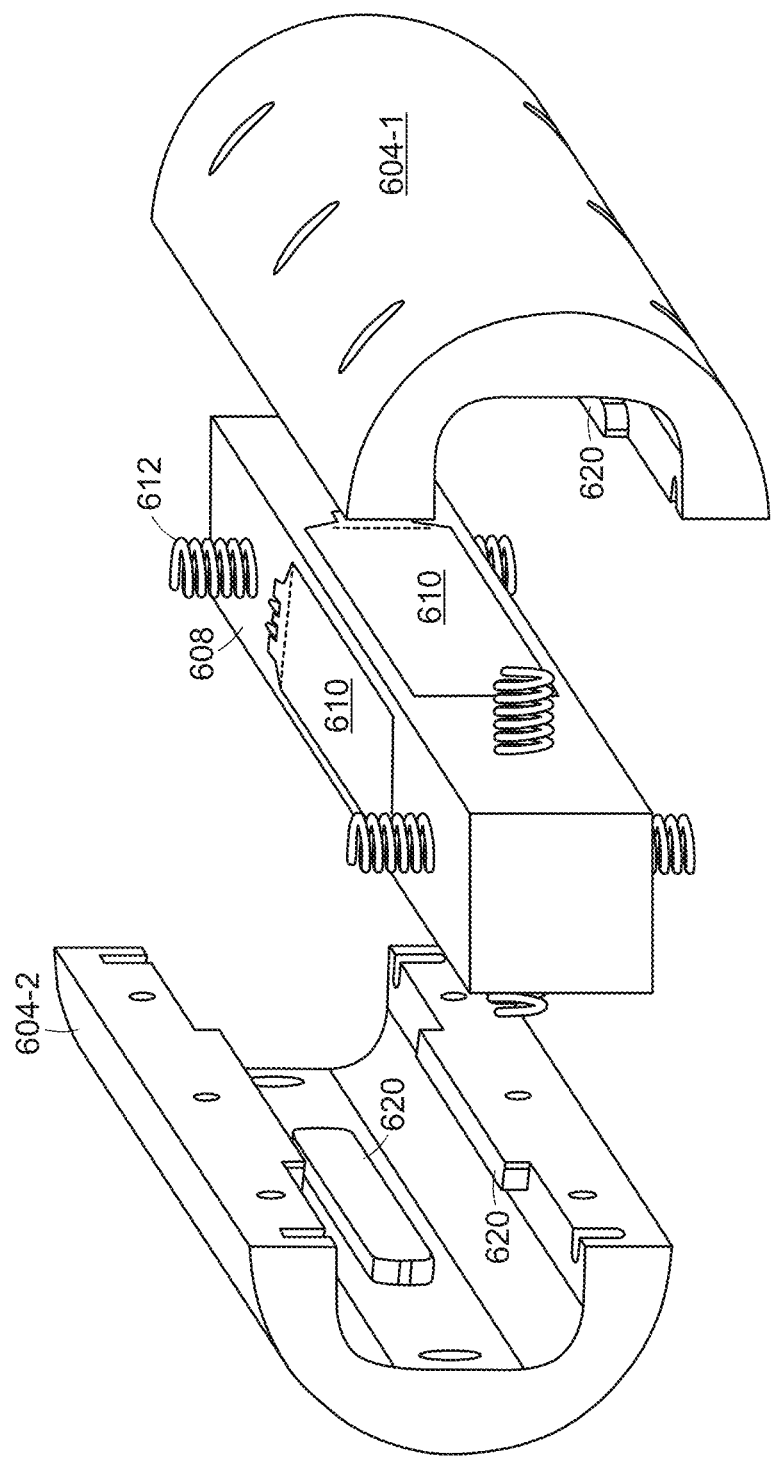

Referring now to FIGS. 6A-6C, in one implementation in accordance with the present disclosure, a force sensing assembly 600 uses flexible circuit sensors to measure force in two directions, i.e., along two axes that are orthogonal to one another. The sensing assembly 600 includes a housing 604 made from two pieces 604-1 and 604-2 and held together by a plurality of screws 605. A structural bar 608 with four (4) faces 609 defined along a longitudinal length of the bar 608 is provided within the housing 604. Generally, the bar 608 is made of a material of sufficient strength to withstand the expected forces that it may experience. The bar 608 may be made from steel, aluminum, etc., and while an exemplary bar 608 is shown with a square cross-section, the bar may be, for example, round, hexagonal, etc. Each face 609 is provided with a respective flexible circuit sensor 610 disposed thereon by, for example, adhesive or other known attachment mechanism. The sensor 610 may be, for example, an FSR® 400 Series Force Sensing Resistor from Interlink Electronics of Westlake Village, Calif. Each sensor 610 includes the necessary connections (not shown) to communicate with the controller 402 as would be understand by one of ordinary skill in the art.

The bar 608 is maintained in a "neutral" position, i.e., where no force is being applied to the assembly 600, by a plurality of springs 612 disposed between the faces 609 and an inner surface of the housing 604. The springs 612 restrain the bar 608 to move along either an "A" axis or a "B" axis where the two axes are orthogonal to one another. While springs 612 are shown in the present disclosure to maintain the relationship between the bar 608 and the housing 604, other mechanisms that provide such flexibility, for example, foam, rubber, plastics, etc., can be implemented.

Figure 7A:
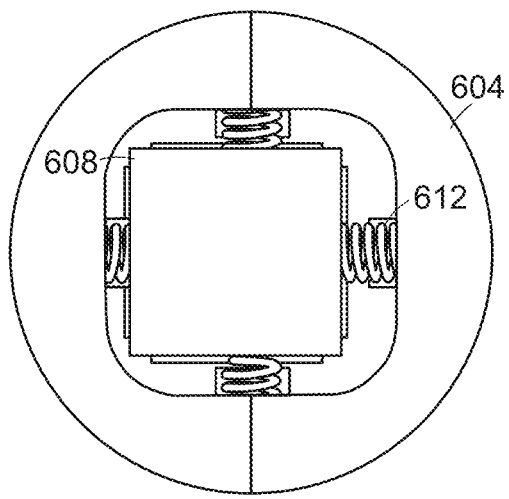
FIGS. 7A-7C are side views of the force sensing assembly of FIGS. 6A-6C in operation.
Figure 7B:
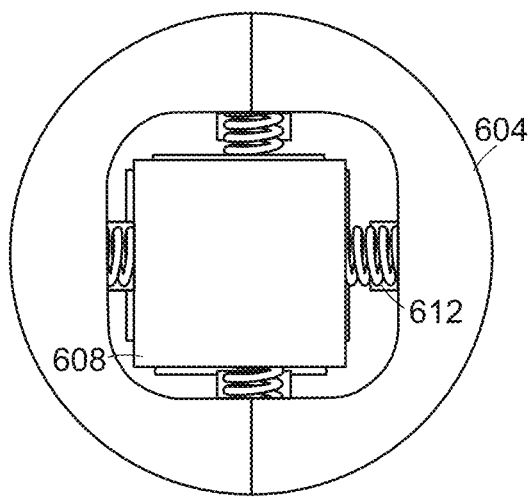
Figure 7C:
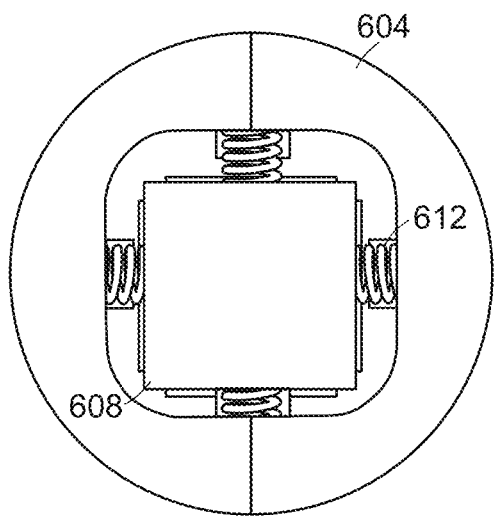
Figure 8A:
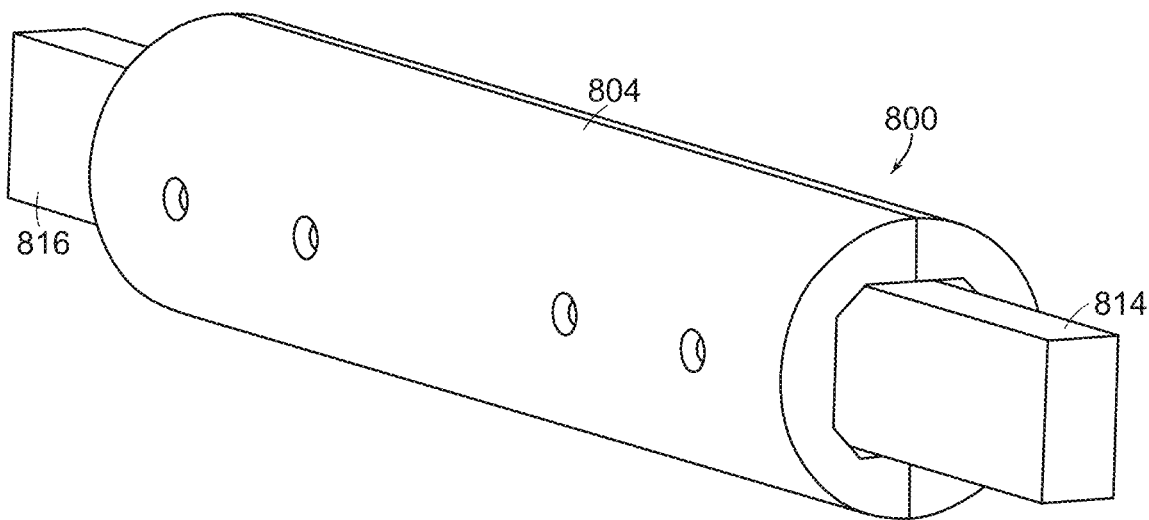
FIGS. 8A-8D are perspective views of a force sensing assembly in accordance with an aspect of the present disclosure.
Figure 8B:
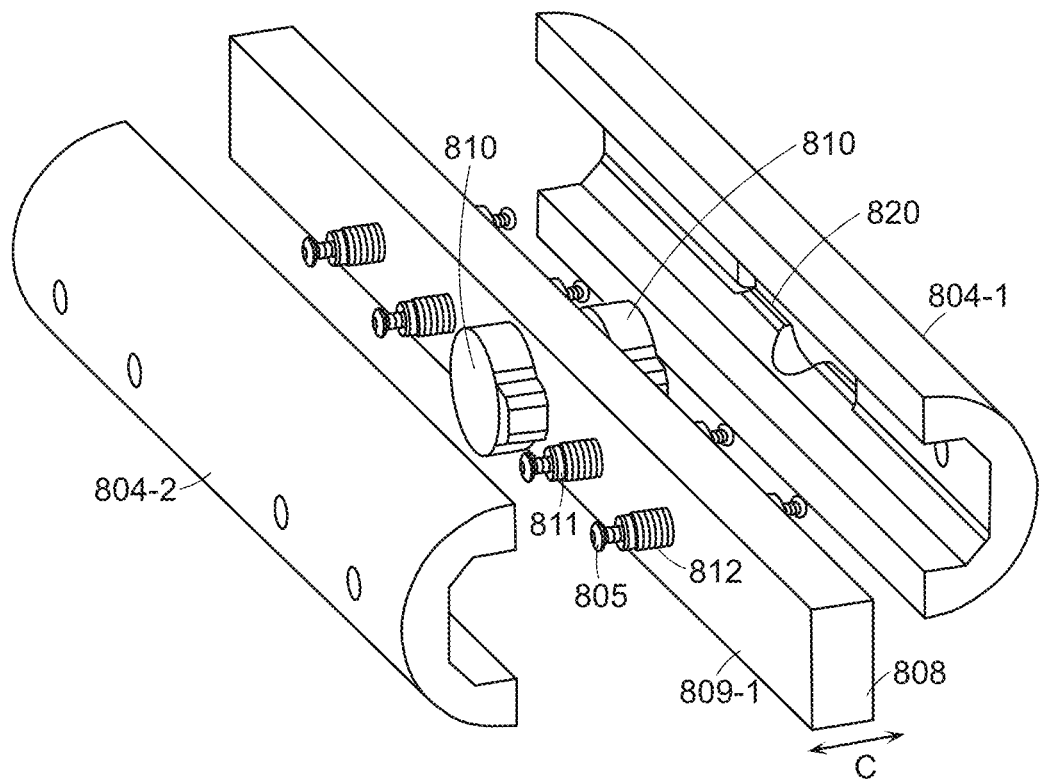
Figure 8C:
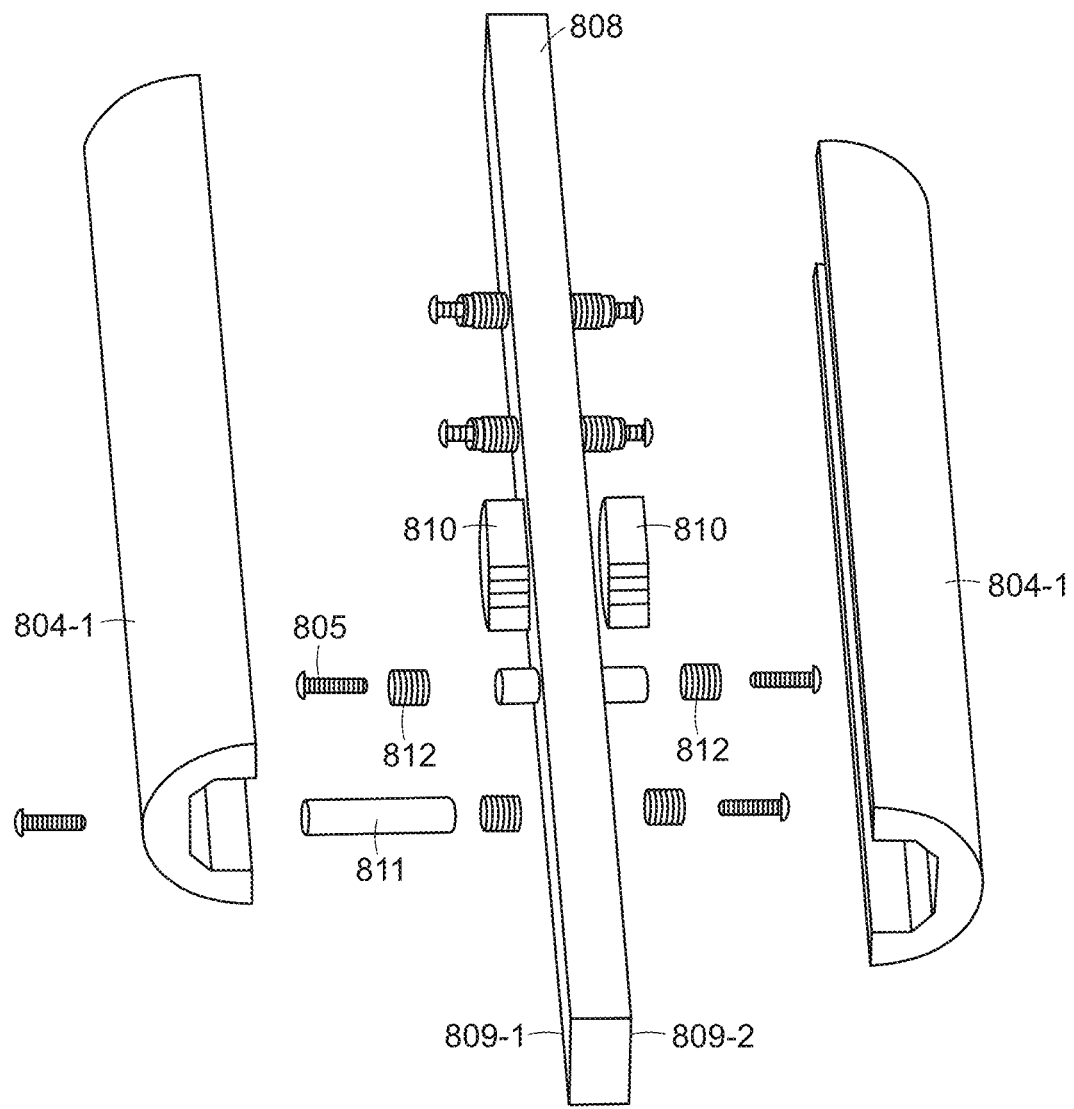
Figure 8D:
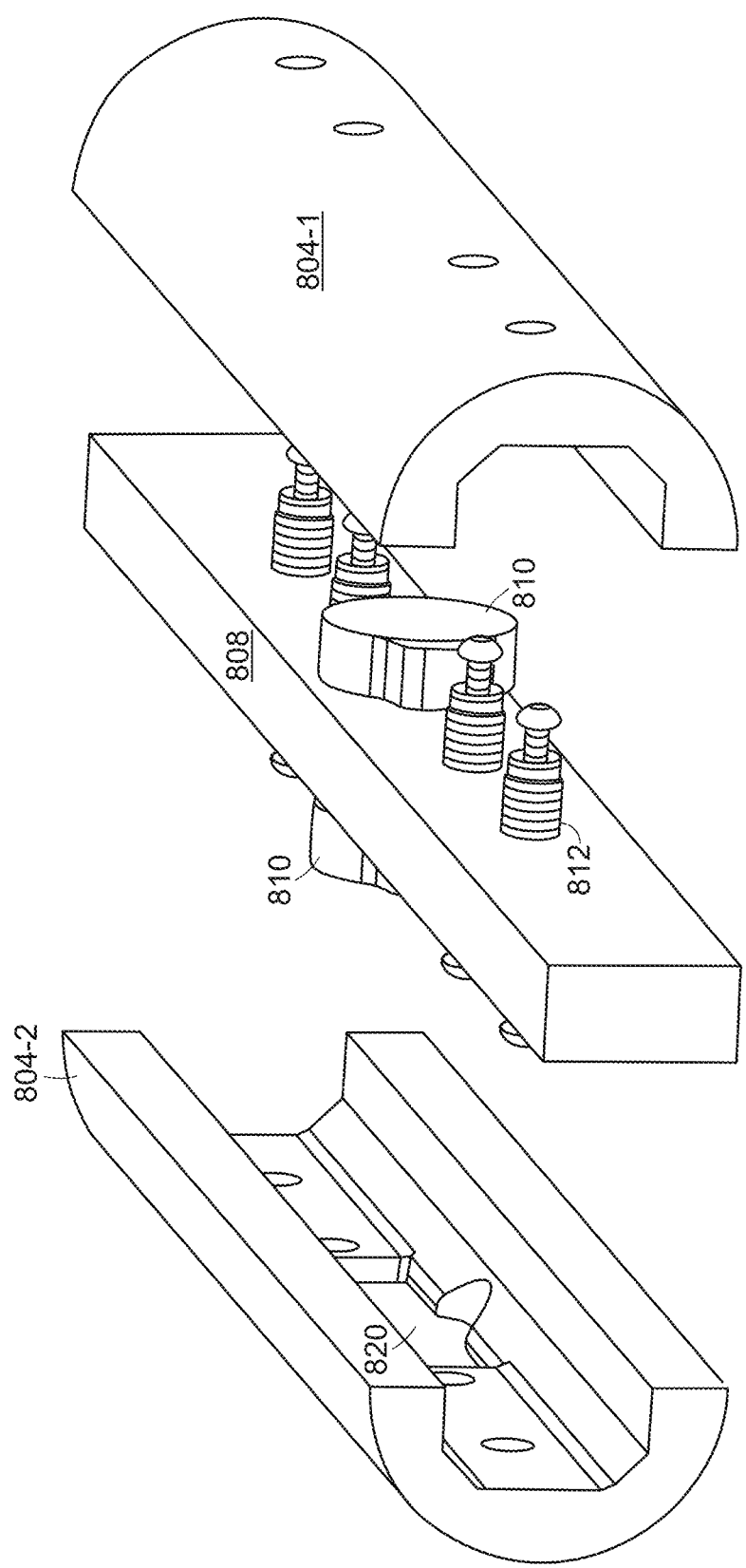

First and second ends 614, 616 of the bar 608 extend from the housing 604. The two ends 614, 616 are each affixed to the vehicle 200, for example, attached to, or incorporated into, the handle 208. As a result, the bar 608 does not move with respect to the vehicle 200. When a force is applied to the housing 604, for example, by the operator, referring now to FIGS. 7A-7C, the springs 612 will compress or expand accordingly. A respective contact feature 620 is provided within the housing 604 in opposition to each sensor 610. When the housing 604 moves, the contact feature 620 contacts the sensor 610. The amount of force in each axis is then measured by the controller 402 and is used to determine the amount of torque to be applied to the wheels in response thereto.

Referring now to FIGS. 8A-8D, in another implementation in accordance with the present disclosure, a force sensing assembly 800 uses single axis load cells to measure force along an axis. The sensing assembly 800 includes a housing 804 made from two pieces 804-1 and 804-2 and held together by a plurality of screws 805, as will be described below. A structural bar 808 with two (2) opposing faces 811-1, 811-2 defined along a longitudinal length of the bar 808 is provided within the housing 804. Generally, the bar 808 is made of a material of sufficient strength to withstand the expected forces that it may experience. The bar 808 may be made from steel, aluminum, etc., and while an exemplary bar 808 is shown with a square cross-section, the bar may be, for example, round, hexagonal, etc. Each face 809-1, 809-2 is provided with a respective single-axis load cell sensor 810 disposed thereon by, for example, adhesive or any other known attachment mechanism. The sensor 810 may be, for example, an FX1901 Compression Load Cell from TE Connectivity company of Fremont, Calif. Each sensor 810 includes the necessary connections (not shown) to communicate with the controller 402 as would be understand by one of ordinary skill in the art.

The bar 808 is maintained in a "neutral" position, i.e., where no force is being applied to the assembly 800, by a plurality of standoffs 811 and corresponding springs 812 disposed between the faces 809-1, 809-2 and an inner surface of the housing 804. The standoffs 811 and the springs 812 restrain the bar 808 to move along a "C" axis. While springs 812 are shown in the present disclosure to maintain the relationship between the bar 808 and the housing 804, other mechanisms that provide such flexibility, for example, foam, rubber, plastics, etc., can be implemented.

Figure 9A:
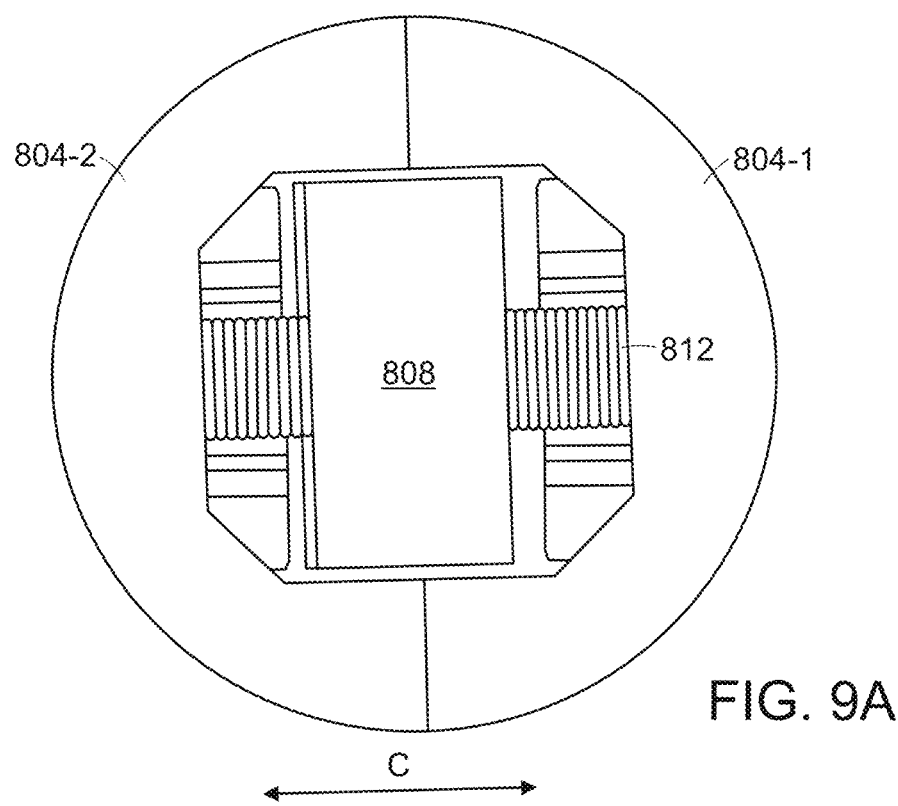
FIGS. 9A-9C are side views of the force sensing assembly of FIGS. 8A-8D in operation.
Figure 9B:
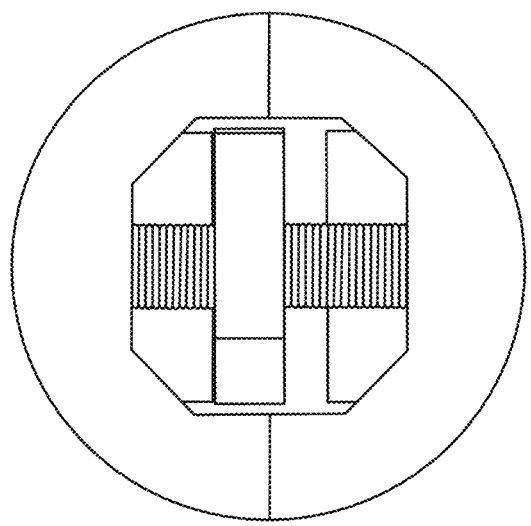
Figure 9C:
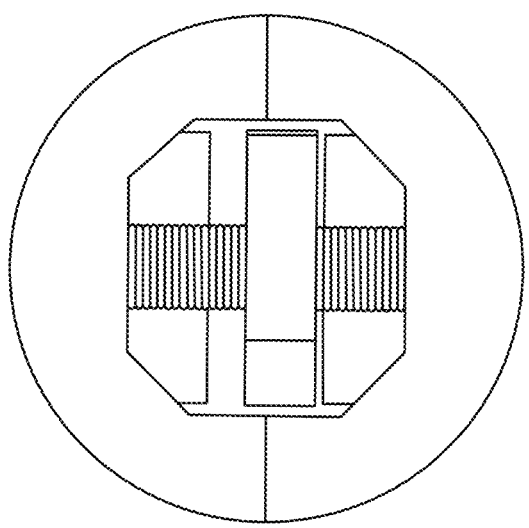

First and second ends 814, 816 of the bar 808 extend from the housing 804. The two ends are each affixed to the vehicle 200, for example, attached to, or incorporated into, the handle 208. As a result, the bar 808 does not move with respect to the vehicle 200. When a force is applied to the assembly 800, for example, by the operator, referring now to FIGS. 9A-9C, the springs 812 will compress or expand accordingly. A respective contact feature 820 is provided within the housing 804 in opposition to each sensor 810. When the housing 804 moves, the contact feature 820 contacts the sensor 810. The amount of force is then measured by the controller 402 and is used to determine the amount of torque to be applied to the wheels in response thereto.

As the amount of force measured by the assembly 800 is only in one axis, an angle at which the vehicle 200 is being operated, with respect to the direction of gravity g, can be determined from, for example, a tilt sensor or the IMU 416. The amount of "push" force and "lift" force being exerted by the operator can then be calculated from that angle and the corresponding amount of torque to apply determined therefrom.

Of course, one of ordinary skill in the art would understand that two sensor assemblies 800 could be implemented with the respective sensing axis positioned orthogonally with respect to the other. Such an arrangement may not then need to determine an angle at which the vehicle is operating in order to determine the amount of additional torque to provide.

Figure 10A:
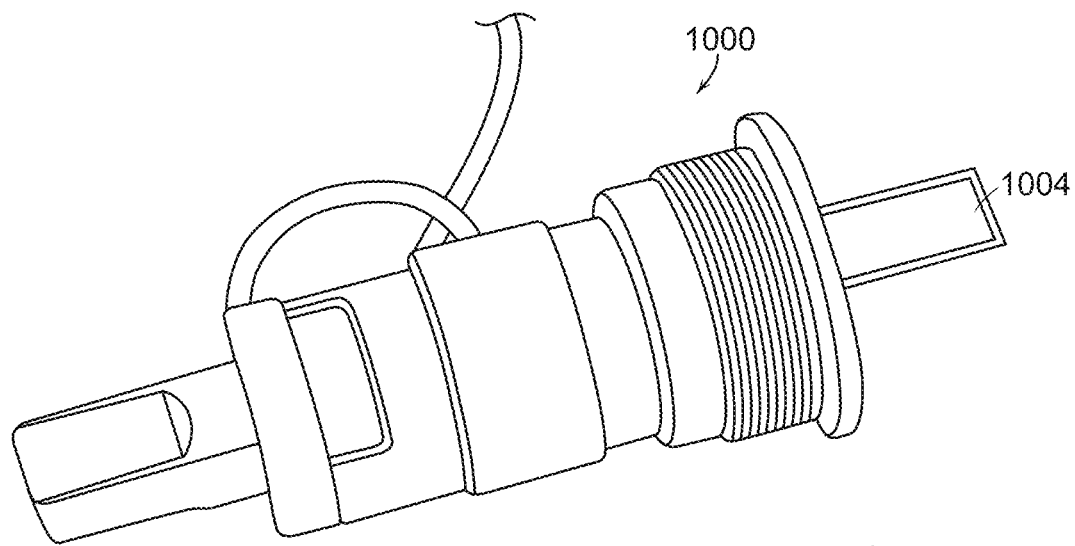
FIGS. 10A and 10B are perspective views of a torque sensing assembly in accordance with an aspect of the present disclosure.
Figure 10B:
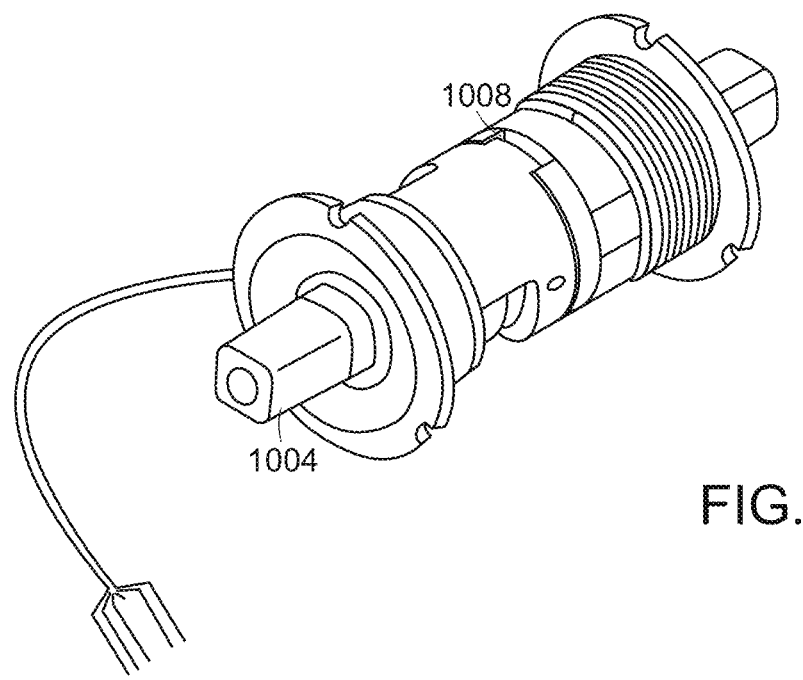

In another aspect of the present disclosure, referring now to FIGS. 10A and 10B, a torque sensing assembly 1000 is used to measure force applied by the operator. The torque sensing assembly 1000 could be a Thun X-Cell Sensory Bottom Bracket from Alfred Thun GmbH & Co. KG, Ennepetal, Germany. The sensing assembly 1000 includes a spindle 1004 disposed within a housing 1008 that includes a sensor plate (not shown). Each sensor 1000 includes the necessary connections to communicate with the controller 402 as would be understood by one of ordinary skill in the art.

The housing 1008 is affixed to the vehicle 200, for example, attached to, or incorporated into, the handle 208. As a result, the housing 1008 does not move with respect to the vehicle 200 and the axis of torque is predetermined with respect to an orientation of the vehicle 200. The spindle 1004 is attached to the handle 208 in such a position that when a force is applied by the operator, the amount of force will be measured as a torque force by the sensing assembly 1000. The amount of operator-applied torque is then measured by the controller 402 and is used to determine the amount of torque to be applied to the wheels in response thereto.

As the assembly 1000 is measuring torque, an angle at which the vehicle 200 is being operated, with respect to the direction of gravity g, is determined from, for example, a tilt sensor or the IMU 416. The amount of "push" force and "lift" force being exerted by the operator can then be calculated from that angle and the corresponding amount of torque to apply to the wheels determined therefrom.

Various implementations of the above-described systems and methods described may be provided in digital electronic circuitry, in computer hardware, firmware, and/or software. An implementation can be as a computer program product, e.g., a computer program tangibly embodied in an information carrier. The implementation can, for example, be in a machine-readable storage device, for execution by, or to control the operation of, data processing apparatus. The implementation can, for example, be a programmable processor, a computer, and/or multiple computers.

The above-described implementations generally depict a computer implemented system employing at least one processor executing program steps out of at least one memory to obtain the functions herein described. It should be recognized that the presently described methods may be implemented via the use of software, firmware or alternatively, implemented as a dedicated hardware solution such as an FPGA (field programmable gate array) and/or an ASIC (application specific integrated circuit). Modules, subroutines, and software agents can refer to portions of the computer program, the processor, the special circuitry, software, and/or hardware that implements that functionality.

A computer program can be written in any form of programming language, including compiled and/or interpreted languages, and the computer program can be deployed in any form, including as a stand-alone program or as a subroutine, element, and/or other unit suitable for use in a computing environment.

The display can be a liquid crystal display (LCD) or the like. The interaction with an operator can, for example, be a display of information to the operator and a keyboard and a pointing device, e.g., a mouse, touch pad or a trackball, by which the operator can provide input. Other kinds of devices can be used to provide for interaction with an operator, for example, by providing sensory feedback, e.g., visual feedback, auditory feedback or tactile feedback. Input from the operator can, for example, be received in any form, including acoustic, speech and/or tactile input.

Figure 11:
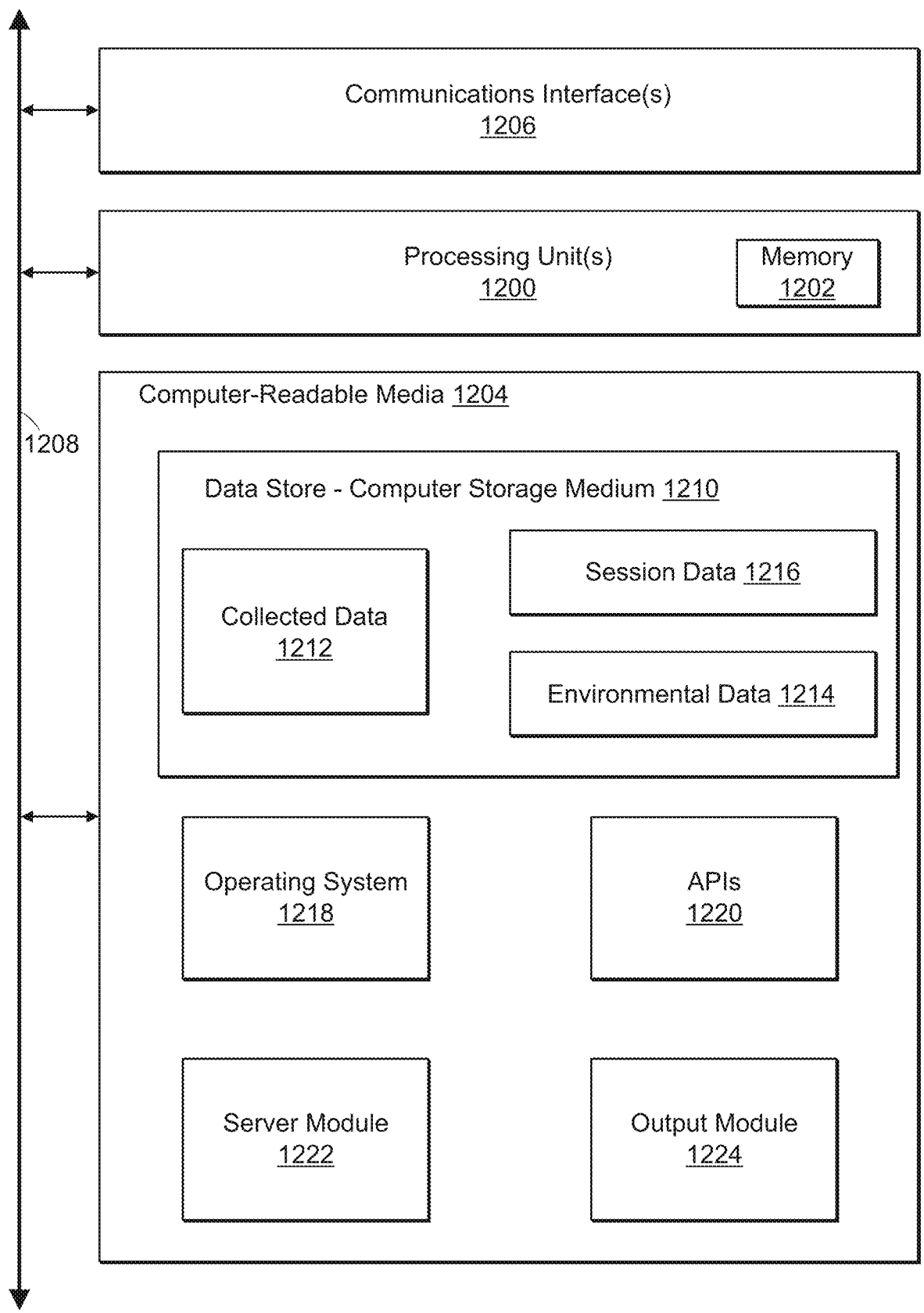
FIG. 11 is a block diagram illustrating an example of an implementation of the vehicle control system of the present disclosure within a computing device.

FIG. 11 is a block diagram of an example implementation of the system within a computing device. In this example, the computing device includes one or more processors or processing units 1200, one or more memories 1202, a computer-readable medium 1204, and one or more communications interfaces 1206. In this example, the one or more processing units 1200, one or more memory units 1202, computer-readable medium 1204, and one or more communication interfaces 1206 are in signal communication and operatively connected with each other via a bus signal path 1208 which may include one or more system buses such as a data bus, an address bus, a PCI bus, a Mini-PCI bus, and any variety of local, peripheral, and/or independent buses.

The computer-readable medium 1204 includes encoded computer-executable instructions that cause the one or more processors 1200 to generate a data store 1210 from the collected data 1212 from the sensors and operator input thus generating control output signals based on the collected data 1212 and optional environmental data.

As utilized, the one or more processing units 1200 may represent, for example, a CPU-type processing unit, a GPU-type processing unit, a field-programmable gate array ("FPGA"), digital signal processor(s) ("DSP"), or other hardware logic components that may, in some instances, be driven by a central processing unit ("CPU").

The computer-readable medium 1204 may store instructions executable by the one or more processing units 1200 and may include computer storage media and/or communication media. Computer storage media may include one or more of volatile memory, nonvolatile memory, and/or other persistent and/or auxiliary computer storage media.

The one or more communication interfaces 1206 may represent, for example, network interface controllers ("NICs") or other types of transceiver devices to send and receive communications over a network. In this example, the computer-readable medium 1204 includes a data store 1210.

The data store 1210 may store data for the operation of processes, applications, components, and/or modules stored in computer-readable medium 1204, such as the vehicle control system and/or executed by the one or more processing units 1200 and/or accelerator(s). As an example, the data store 1210 may store environmental data 1214, session data 1216 and/or other collected data 1212.

Additionally, the computer-readable medium 1204 may include one or more modules such as the server module 1222, input module (not shown), and output module 1224, although the number of illustrated modules is just an example, and the number may vary higher or lower.

Advantageously, aspects of the present disclosure provide more intuitive controls for power assisted devices whose unassisted counterparts are controlled by pushing or pulling the device itself. That is, aspects of this disclosure allow the operator to use identical inputs, i.e., pushing and pulling on a handle, to control power-assisted versions of existing products. The effort of the operator is measured and the amount of provided assist is proportional to the effort.

With the more intuitive, i.e., more familiar, controls of the present disclosure, necessary training for the power-assisted version is reduced because of the similarity to operation of the non-powered counterpart. Further, design changes to existing products are minimized allowing for easier retrofitting or manufacturing. An "electronic throttle" control of the powered device can be implemented without changing the motion or adding a new motion as compared to the operation of the non-powered device. Thus, those throttle controls such as thumbwheels, joysticks, and grip throttles, can be avoided.

Further, the aspects of the present disclosure described herein can also be applied to the control of a self-balancing hand truck in order to determine a static balancing point.

This disclosure is illustratively described above in reference to the disclosed implementations. Various modifications and changes may be made to the disclosed implementations by persons skilled in the art without departing from the scope of the disclosure as defined in the claims.

What is claimed is:

1. A method of operating a payload-carrying vehicle having a system configured to provide torque to one or more ground contacting elements, the method comprising, repeatedly:
    measuring a pitch angle of the vehicle;
    measuring a respective magnitude and direction of force applied by a user to the vehicle along a first axis, wherein the first axis is in a predetermined and fixed relationship to the vehicle;
    calculating an amount of push force exerted by the user as a function of the measured magnitude and direction of force applied by the user along the first axis and the measured pitch angle;
    calculating an amount of lift force exerted by the user as a function of the measured magnitude and direction of force applied by the user along the first axis and the measured pitch angle;
    determining a respective amount of torque to apply to each of the one or more ground contacting elements as a function of the calculated push and lift forces; and
    providing the respective determined amount of torque to each of the one or more ground contacting elements.

2. The method of claim 1, wherein measuring the force applied by the user to the vehicle further comprises:
    measuring a respective magnitude and direction of force along a second axis that is orthogonal to the first axis;
    calculating the amount of push force exerted by the user as a function of the measured magnitude and direction of force applied by the user along the second axis and the measured pitch angle; and
    calculating the amount of lift force exerted by the user as a function of the measured magnitude and direction of force applied by the user along the second axis and the measured pitch angle.

3. The method of claim 1, wherein measuring the force applied by the user to the vehicle further comprises:
    measuring a respective magnitude and direction of torque about a handle axis, wherein the handle axis is in a predetermined relationship to the vehicle; and
    determining the respective amount of torque to apply to each of the one or more ground-contacting elements as a function of the measured torque about the handle axis.

4. The method of claim 1, wherein determining the direction and magnitude of the measured force comprises:
    resolving the measured user force into three component vectors along respective X, Y, and Z axes; and
    determining the respective amounts of torque to apply to each of the one or more ground contacting elements as a function of the three component vectors.

5. The method of claim 4, wherein resolving the measured user force into three component vectors along respective X, Y, and Z axes further comprises:
    rotating the applied force vectors to a reference frame of the vehicle.

6. A method of operating a payload-carrying vehicle having one or more power-assisted ground-contacting elements, the method comprising, repeatedly:
    measuring, with a tilt sensor, a pitch angle of the vehicle;
    measuring, with a sensing assembly, a respective amount of force applied by a user to the vehicle along two or more orthogonal axes that are in a predetermined and fixed relationship with the vehicle;
    determining, with a processor coupled to the sensing assembly and the tilt sensor, an amount of push force and an amount of lift force exerted by the user as a function of the measured respective amounts of force applied by the user along the two or more orthogonal axes and the measured pitch angle;
    determining, with the processor, a respective amount of torque to be applied to each of the one or more ground-contacting elements as a function of the determined push and lift forces; and
    applying, under control of the processor, the respective determined amount of torque to each of the one or more ground-contacting elements.

7. The method of claim 6, wherein the sensing assembly comprises a torque sensor, further comprising:
    measuring, with the torque sensor, a torque applied by the user to the vehicle; and
    determining, with the processor, the respective amount of torque to be applied to each of the one or more ground-contacting elements as a function of the measured torque applied by the user.

8. The method of claim 6, further comprising:
    measuring, with the tilt sensor, the pitch angle with respect to a direction of gravity.

9. A system for operating a payload-carrying vehicle having one or more power-assisted ground-contacting elements, the system comprising:
    a sensing assembly configured to repeatedly measure a respective amount of force applied by a user to the vehicle along two or more orthogonal axes that are in a predetermined and fixed relationship with the vehicle;
    a tilt sensor configured to repeatedly measure a pitch angle of the vehicle;
    a processor, coupled to the sensing assembly and the tilt sensor, configured to repeatedly:
        determine an amount of push force and an amount of lift force exerted by the user as a function of the measured respective amounts of force applied by the user along the two or more orthogonal axes and the measured pitch angle;
        determine a respective amount of torque to be applied to each of the one or more ground-contacting elements as a function of the determined push and lift forces; and output a control signal to cause the application of the respective determined amount of torque to each of the one or more ground-contacting elements.

10. The system of claim 9, wherein:
the sensing assembly further comprises a torque sensor configured to measure a torque applied by the user to the vehicle; and
the processor is further configured to determine the respective amount of torque to be applied to each of the one or more ground-contacting elements as a function of the measured torque applied by the user.

11. The system of claim 9, wherein the tilt sensor is configured to measure the pitch angle with respect to a direction of gravity.

12. The system of claim 9, further comprising:
a motor, coupled to the processor, configured to provide the respective determined amount of torque to each of the one or more ground-contacting elements in response to the control signal.

* * * * *